US007660299B2

(12) United States Patent
Khouderchah et al.

(10) Patent No.: US 7,660,299 B2
(45) Date of Patent: Feb. 9, 2010

(54) NETWORK-BASED CALL INTERFACE DEVICE FOR REAL-TIME PACKET PROTOCOL CALLS

(75) Inventors: Michel Khouderchah, Cupertino, CA (US); Chandrasekar Krishnamurthy, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 641 days.

(21) Appl. No.: 11/418,865

(22) Filed: May 5, 2006

(65) Prior Publication Data

US 2007/0258456 A1    Nov. 8, 2007

(51) Int. Cl.
*H04L 12/66* (2006.01)
*H04L 12/28* (2006.01)
*H04L 12/56* (2006.01)
*H04J 3/16* (2006.01)
*H04J 3/22* (2006.01)

(52) U.S. Cl. ............ 370/356; 370/395.2; 370/467
(58) Field of Classification Search .......... 370/352, 370/356, 392, 395.2, 410, 466, 467
See application file for complete search history.

(56) References Cited

U.S. PATENT DOCUMENTS

| 7,136,651 B2 | 11/2006 | Kalavade | |
|---|---|---|---|
| 2002/0174247 A1* | 11/2002 | Shen | 709/238 |
| 2004/0255302 A1* | 12/2004 | Trossen | 719/318 |
| 2005/0286496 A1* | 12/2005 | Malhotra et al. | 370/352 |
| 2006/0003770 A1* | 1/2006 | Park | 455/445 |
| 2006/0007954 A1* | 1/2006 | Agrawal et al. | 370/466 |
| 2006/0075483 A1* | 4/2006 | Oberle et al. | 726/14 |
| 2006/0098622 A1* | 5/2006 | Chang et al. | 370/352 |
| 2006/0112170 A1* | 5/2006 | Sirkin | 709/217 |
| 2007/0019625 A1* | 1/2007 | Ramachandran et al. | 370/352 |
| 2007/0211716 A1* | 9/2007 | Oz et al. | 370/389 |
| 2007/0242626 A1* | 10/2007 | Altberg et al. | 370/259 |
| 2007/0248077 A1* | 10/2007 | Mahle et al. | 370/352 |
| 2009/0070406 A1* | 3/2009 | Terpstra et al. | 709/203 |

OTHER PUBLICATIONS

Rosenberg et al., "Session Initiation Protocol (SIP): Locating SIP Servers", RFC 3263, Internet Engineering Task Force, Jun. 2002, pp. 1-17.

"Cisco XR 12000 Series Session Border Controller", pp. 1-5, Nov. 2006, Cisco Systems, Inc.

"Scalable Session Border Control Capabilities for Service Provider Networks", pp. 1-9, Nov. 2006, Cisco Systems, Inc.

(Continued)

*Primary Examiner*—Ayaz R Sheikh
*Assistant Examiner*—Hoang-Chuong Q Vu
(74) *Attorney, Agent, or Firm*—The Law Office of Kirk D. Williams

(57) ABSTRACT

A network-based call interface device is used for real-time packet protocol calls, such as, but not limited to, interfacing real-time calls between client devices and call services/destination devices. The network-based call interface device includes a virtual phone and a virtual server-phone communicating with each other. The virtual phone communicates with the call server making the network-based call interface device appear to the call server as a client device; and the virtual server-phone communicates with the client device making the network-based call interface device appear to the client device as call server.

27 Claims, 8 Drawing Sheets

OTHER PUBLICATIONS

Cisco Multiservice IP-to-IP Gateway—The Cisco IOS Session Border Controller, pp. 1-8, 2006, Cisco Systems, Inc.
"Cisco Session Border Controllers Optimize IP Network Interconnects", Apr. 2007, pp. 1-4, Cisco Systems, Inc.

Jiang et al, "Towards Junking the PBX: Deploying IP Telephony", NOSSDAV'02: Proceedings of the 11th International Workshop on Network and operating systems support for digital audio and video, ACM, Jan. 2001, pp. 177-185.

* cited by examiner

NETWORK-BASED CALL INTERFACE DEVICE FOR REAL-TIME PACKET PROTOCOL CALLS

TECHNICAL FIELD

One embodiment of the invention relates to communications and computer systems, especially routers, packet switching systems, and other devices; and more particularly, one embodiment relates to a network-based call interface device for interfacing real-time media calls, such as, but not limited to, a network-based call interface device that is part of a router and/or session border controller which may be located on the premises of a service provider location and/or, such as, but not limited to, being in the network at a location corresponding to the edge of a private and/or other network(s).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Real-time packet protocol calls are becoming more and more prevalent over packet networks, such as the Internet, service provider networks, and enterprise networks. For example, these calls may include voice packet protocol calls (e.g., using Voice over Internet Protocol) and/or video packet protocol calls. The device which a person uses in making such a packet call is sometimes referred to as a client call device. These can be, for example, specialized hardware phone available from packet phone and router vendors, or even a personal computer running specialized software to turn the computer into a "soft phone." These client call devices communicate over a packet network to a call server, such as a Session Initiation Protocol (SIP) call server, which allows calls to be sent to and received from other packet and non-packet client call devices and other endpoints.

Current solutions using real-time packet protocol technology may have many drawbacks. For example, a person may wish to be able to access multiple call servers, which may include private enterprise network (e.g., business) and/or public service provider call servers. This may be especially desirable for traveling and/or telecommuting employees. However, currently, a person will typically use separate and independent client call devices (e.g., one for each call server) or a client call device that allow a selection of various call servers, but only one call server may be selected at a time. Additionally, a personal computer may run separate instances of "soft phone" software which makes the computer seem like multiple client call devices, with each of these independent soft phone client call devices using a different call server. Another common issue is that an enterprise SIP server (e.g., that of a business) is often located behind a network protection device (e.g., firewall, network address translation (NAT) device, network address and port translation (NAPT) device, etc.), which protects the business's corresponding enterprise network. Thus, the client call device of an employee may be blocked from communicating with the enterprise SIP server, and therefore, when off of the business premises, the employee cannot access the enterprise SIP server to send and receive calls and voicemail messages. A client call device may include specialized software which allows it to tunnel into a firewall-protected enterprise network, but this requires specialized software a secure connection established each time the client call device registers with the server. Additionally, this approach requires a separate tunnel for each of the client call devices, which requires a lot of resources, presents many administrative problems, and may present a security point of vulnerability. Desired are better ways of accessing call servers from client call devices.

SUMMARY

Disclosed are, inter alia, methods, apparatus, data structures, computer-readable media, mechanisms, and means that may be associated with a network-based call interface device for real-time packet protocol calls, such as, but not limited to, interfacing real-time calls between client devices and call servers/destination devices. One embodiment includes a network-based call interface device located in a network. The network-based call interface device is configured to interface real-time media calls between client devices and client servers/remote client devices.

A client call device registers with the network-based call interface device, which typically appears to the client call device as a call server. The network-based call interface device, in response, registers with one or more call servers, with the network-based call interface device typically appearing as a client call device to each of these call server(s). The network-based call interface device performs an interfacing function so that the client call device can communicate with the call server and remote call devices associated therewith. This interfacing may include using multiple signaling protocols and/or transcoding the media call. Additionally, by having the network-based call interface device trusted by one or more network protection devices (e.g., firewalls, NAT/NAPT devices, etc.), call traffic that would otherwise be blocked between a client call device and a call server and/or destination client call device may be safely allowed to pass if it was interfaced by the network-based call interface device. In one embodiment, a secure tunnel is available to the network-based call interface device to securely communicate with the call server and/or destination client call device. In one embodiment, the call server and/or destination client call device provides security authentication features before allowing access to the secured call server and/or destination client call device. One embodiment of the network-based call interface device is included in a Session Border Controller, such as, but not limited to the Cisco Multiservice IP-to-IP Gateway available from Cisco Systems, Inc.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
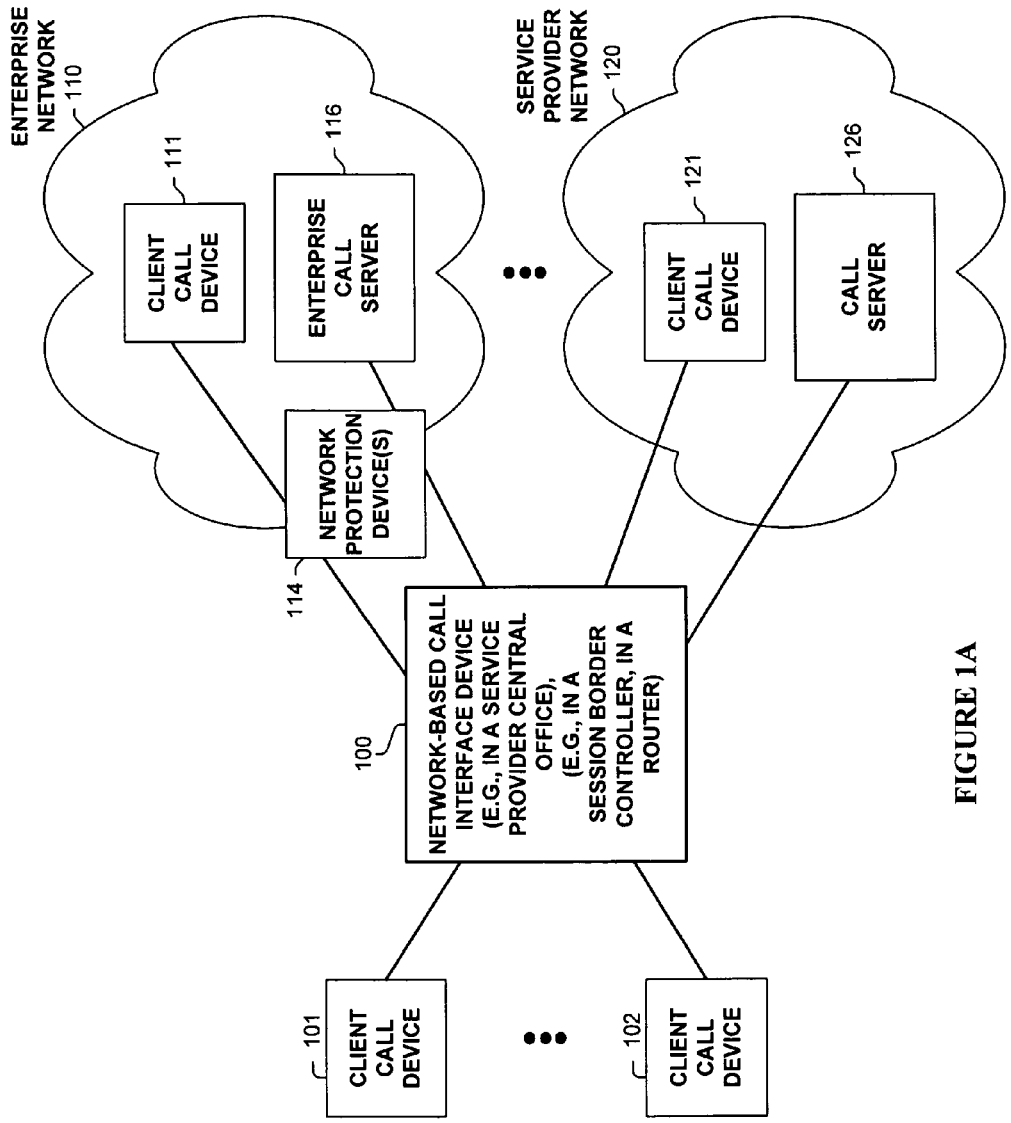
FIGS. 1A-C, and 2 are block diagrams illustrating a few of an extensible number of different network-based call interface device than may be used in one embodiment.

Disclosed are, inter alia, methods, apparatus, data structures, computer-readable media, mechanisms, and means that may be associated with a network-based call interface device for real-time packet protocol calls, such as, but not limited to, interfacing real-time calls between client devices and call servers/destination devices.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means that may be associated with a network-based call interface device for real-time packet protocol calls, such as, but not limited to, interfacing real-time calls between client devices and call servers/destination devices. One embodiment includes a network-based call interface device located in a network. The network-based call interface device is configured to interface real-time media calls between client devices and client servers/remote client devices.

In one embodiment, a client call device registers with the network-based call interface device, which typically appears to the client call device as a call server. The network-based call interface device, in response, registers with one or more call servers, with the network-based call interface device typically appearing as a client call device to each of these call server(s). The network-based call interface device performs an interfacing function so that the client call device can communicate with the call server and remote call devices associated therewith. This interfacing may include using multiple signaling protocols and/or transcoding the media call. Additionally, by having the network-based call interface device trusted by one or more network protection devices (e.g., firewalls, NAT/NAPT devices, etc.), call traffic that would otherwise be blocked between a client call device and a call server and/or destination client call device may be safely allowed to pass if it was interfaced by the network-based call interface device. In one embodiment, a secure tunnel is available to the network-based call interface device to securely communicate with the call server and/or destination client call device. In one embodiment, the call server and/or destination client call device provides security authentication features before allowing access to the secured call server and/or destination client call device. One embodiment of the network-based call interface device is included in a Session Border Controller, such as, but not limited to the Cisco Multiservice IP-to-IP Gateway available from Cisco Systems, Inc.

One embodiment is performed by a network-based call interface device located in a network. A call server registration request is received, in one or more packets, from a client call device, the client call device being located remotely from the network-based call interface device. In response to the received call server registration request, the network-based call interface device is registered with each of a plurality of call servers on behalf of the client call device. Subsequent to said registration with each of the plurality of call servers and while network-based call interface device is registered with the plurality of call servers: an initiate call request is received, in one or more packets, for establishing a real-time media packet-based call between the client call device and a destination client call device registered with a particular call server of the plurality of call servers. In response to said received initiate call request, a particular call is set up between the client device and the destination client call device, which includes establishing calls between the client device and the network-based call interface device and between the network-based call interface device and the destination client call device and interfacing said established calls, with each of said established calls being real-time media packet-based calls; wherein said establishing calls includes communicating one or more signaling messages with the particular call server.

One embodiment includes: maintaining a virtual phone for each of the plurality of call servers and a virtual server-phone for the client call device and communicating call data between the virtual server-phone and said virtual phone corresponding to the particular call server; wherein said maintaining the virtual phone includes maintaining a current call state; and wherein said interfacing the particular call includes maintaining a real-time media packet-based call between the client call device and the virtual server-phone and maintaining a real-time media packet-based call between said virtual phone corresponding to the particular call server and the destination client call device. In one embodiment, the call server registration request is received using a first signaling protocol, and said registering the network-based call interface device with each of a plurality of call servers on behalf of the client call device is performed using a second signaling protocol for at least one of the plurality of call servers, wherein the first and second signaling protocols are different. In one embodiment, either the first or second signaling protocol is Session Initiation Protocol (SIP). In one embodiment, either the first or second signaling protocol is H.323. In one embodiment, the call server registration request is received using Session Initiation Protocol (SIP). In one embodiment, the call server registration request is received using H.323.

In one embodiment, a network protection device is configured and is located in the network in a position to block real-time media packet-based calls directly between the client device and the particular call server or directly between the client device and the destination client call device. In one embodiment, a network protection device is configured and is located in the network in a position to block real-time media packet-based calls directly between the client device and the particular call server; wherein a secure tunnel is maintained to allow the network-based call interface device to communicate with the particular call server; and wherein said registration of the network-based call interface device with the particular call server includes communicating one or more packets using the secure tunnel. One embodiment includes: in response to said received call server registration request and prior to said registering the network-based call interface device with each of the plurality of call servers, performing one or more lookup operations on one or more data structures to identify the plurality of call servers for which to register. In one embodiment, said one or more lookup operations identify corresponding parameters for each of the plurality of call servers, and said registering the network-based call interface device with each of the plurality of call servers includes providing corresponding parameters to call servers of the plurality of call servers.

One embodiment includes a network-based call interface device located in a network, with the network including: a plurality client call devices including a particular client call device, one or more call servers, and the network-based call interface device. Each of said client call devices are located remotely from the network-based call interface device. In one embodiment, the network-based call interface device includes: one or more interfaces for communicating real-time packet traffic with said client call devices and said call servers; and a call interface mechanism configured to interface real-time media packet-based calls between said client call devices and said call servers in the network, wherein said interfacing real-time media packet-based calls includes interfacing a particular call of said real-time media packet-based calls between the particular client call device and a particular call server of said call servers such that the network-based call interface device appears to the particular call server as a user device, and the network-based call interface device appears to the particular client call device as a call server.

In one embodiment, the network includes a network protection device configured to block real-time media packet-based call traffic not being interfaced by the network-based call interface device between the particular call server and said client call devices. In one embodiment, In one embodiment, the network-based call interface device is trusted by the particular call server such that at least one of said interfaces is configured to communicate real-time media packet-based calls with the particular call server without being blocked by the network protection device; and wherein said network-based call interface device is configured to determine whether or not a particular real-time media packet-based call to the particular call server initiated by the particular client device is authorized, and in response to determining that it is authorized, allowing the particular call to be interfaced between the particular client call device and the particular call server.

In one embodiment, wherein said real-time media packet-based calls use Real-time Transport Protocol (RTP). In one embodiment, said real-time media packet-based calls are packetized voice calls. In one embodiment, said real-time media packet-based calls are packetized video telephony calls.

In one embodiment, an interface of said interfaces is configured to receive, in one or more packets, a call server registration request from the particular client call device; and wherein the call interface mechanism is configured to, in response to said received call server registration request from the particular client call device, register the network-based call interface device with the particular call server for real-time media packet-based calls associated with the particular client call device. In one embodiment, the call interface mechanism is configured to, in response to said received call server registration request from the particular client call device, also register the network-based call interface device with a second call server of said call servers different from the particular call server for real-time media packet-based calls associated with the particular client call device. In one embodiment, the call interface device while the network-based call interface device is registered with and capable of receiving from, and initiating calls to, both the particular call server and the second call server on behalf of the particular client device, is configured to interface a second particular call of said real-time calls between the particular client device and the second call server such that the network-based call interface device appears to the second call server as a user device, and the network-based call interface device appears to the particular client device as a call server. In one embodiment, the network-based call interface device is included in a router located on a service provider premises. In one embodiment, said interfacing the particular call includes communicating with the particular call server using a first packet signaling protocol and communicating with the particular client call device using a second packet signaling protocol, wherein the first and second real-time packet protocols are different.

One embodiment includes a network-based call interface device located in a network, with the network-based call interface device comprising: means for registering the network-based call interface device with each of a plurality of call servers in response to receiving, in one or more packets, a call server registration request from a client call device; and means for establishing a particular call between the client device and a destination client call device using a particular call server of the plurality of call servers in response to an initiate call request received from either the client device or the particular call server subsequent to registration with each of the plurality of call servers and while the network-based call interface device is registered with the plurality of call servers. In one embodiment, said establishing the particular call between the client device and the destination client call device includes: establishing a call between the client device and the network-based call interface device, and establishing a call between the network-based call interface device and the destination client call device through one or more signaling messages with the particular call server, and interfacing said established calls; wherein each of said established calls are real-time media packet-based calls.

One embodiment includes means for maintaining a virtual phone for each of the plurality of call servers and a virtual server-phone for the client call device, with said maintaining the virtual phone and said maintaining the virtual server-phone each includes maintaining a current call state; and wherein said interfacing the particular call includes maintaining a real-time packet call between the client call device and the virtual server-phone and maintaining a real-time packet call between said virtual phone in the network-based call interface device corresponding to the particular call server and the destination client call device; and communicating call data between said virtual server-phone and said virtual phone corresponding to the particular call server.

In one embodiment, the network-based call device communicates with the particular call server via a secure tunnel. In one embodiment, the network-based call interface device is configured to register with the plurality of call servers using multiple signaling protocols, said signaling protocols including Session Initiation Protocol (SIP) and H.323. In one embodiment, the network-based call interface device is configured to: in response to said received call server registration request and prior to said registering the network-based call interface device with each of the plurality of call servers, performing one or more lookup operations on one or more data structures to identifying the plurality of call servers for which to register. In one embodiment, said one or more lookup operations identify corresponding parameters for each of the plurality of call servers, and said registering the network-based call interface device with each of the plurality of call servers includes providing corresponding parameters to call servers of the plurality of call servers.

One embodiment is used in conjunction with a network-based call interface device located in a network. The network-based call interface device is configured to interface multiple voice over Internet Protocol (VOIP) calls between one or more client devices and one or more VOIP servers. The network-based call interface device is trusted by a VOIP server behind a secure network protection device communicatively coupled to the network. The secure network protection device is configured to allow traffic, including VOIP traffic, between the network-based call interface device and the VOIP server and to prevent VOIP traffic via the network between the VOIP server and a particular client device of said client devices communicatively coupled to the network.

In one embodiment, the network-based call interface device is configured to interface one or more calls between the VOIP server and the network-based call interface device such that the network-based call interface device appears to the VOIP server as a user device with said calls appearing to the VOIP server as VOIP calls between the VOIP server and the network device, with the network-based call interface device appearing to the particular client device as a VOIP server with said calls appearing to the particular client device as VOIP calls between the particular client device and the network-based call interface device. In one embodiment, in response to a received one or more registration messages from the particular client device, the network-based call interface device registers with the VOIP server for VOIP service for the particular client device.

In one embodiment, a second VOIP server is connected to the network, with the network-based call interface device being also configured to interface one or more calls between the second VOIP server and the network-based call interface device such that the network-based call interface device appears to the second VOIP server as a user device with said calls appearing to the second VOIP server as VOIP calls between the second VOIP server and the network device. In one embodiment, in response to a received one or more registration messages from the particular client device, the network-based call interface device registers with the VOIP server for VOIP service for the particular client device and registers with the second VOIP server for VOIP service for the particular client device. In one embodiment, the particular client device is associated with a particular telephone number, and wherein said registering with the VOIP server includes registering the particular telephone number with the VOIP server, and wherein said registering with the second VOIP server includes registering the particular telephone number with the second VOIP server. In one embodiment, the particular client device is associated with a first particular telephone number and a second particular telephone number, and wherein said registering with the VOIP server includes registering the first particular telephone number with the VOIP server, and wherein said registering with the second VOIP server includes registering the second particular telephone number with the second VOIP server. In one embodiment, said interfacing calls includes: receiving a call initiation message from the particular client device, the call initiation message identifying a desired remote destination associated with either the VOIP server or the second VOIP server, and in response, setting up a VOIP call through said associated VOIP server to the remote destination and a call between the network-based call interface device and the particular client device, and relaying VOIP packets being communicating between the particular client device and the remote destination. In one embodiment, said interfacing calls includes setting up a call between the particular client device and the network-based call interface device in response to receiving a call setup message received from the VOIP server or the second VOIP server. In one embodiment, said interfacing includes while said relaying VOIP packets, notifying the particular device of a second call received from a VOIP server different than the particular VOIP server used to establish the VOIP corresponding to said relaying VOIP packets.

Turning to the figures, FIG. 1A illustrates a network including a network-based call interface device 100 located in a network, with this network including an enterprise network 110 and a service provider network 120. In one embodiment, network-based call interface device 100 allows a single client call device 101, 102, 111, 121 to appear as multiple virtual terminals to different call servers 116, 126, whether they be located in a public or private domain.

When a call server is protected by a network protection device 144 (e.g., call server 116 is in enterprise network 110 protected by network protection device 114), network-based call interface device 100 is typically a trusted device (e.g., has secure access typically via a security tunnel through network protection device 114 and typically provides security authorization to prevent unauthorized traffic from being routed into the private domain). In one embodiment, traffic corresponding to multiple client call devices of client call devices 101, 102, 111, 121 is sent via a single secure tunnel to call server 116.

For example, in one embodiment, a client call device 101, 102, 111, 121 may simultaneously appear as a home and/or wireless phone (e.g., using call server 126) and/or a business phone (e.g., using enterprise call server 116). In other words, client call device 101, 102, 111, 121 may be able to be used to initiate and receive calls using a home, work, wireless, and/or computer telephone number or network address. A client call device 101, 102, 111, 121 may be connected to the network via an extensible number of means, such as, but not limited to, via wireless technology (e.g., WIFI or cellular service, etc.) and/or wired technology.

Figure 1B:
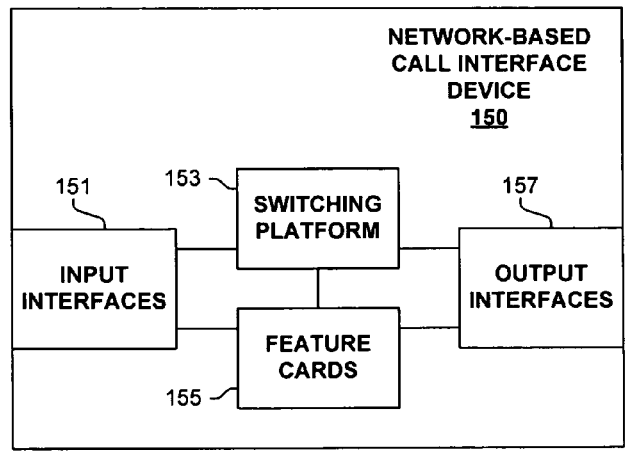

FIG. 1B illustrates a device 150 (e.g., a router, possibly including service border controller functionality) which includes the capability of interfacing real-time packet protocol calls between client devices and call servers and is used in one embodiment. As shown, device 150 includes multiple interfaces 151 and 157 for sending and receiving packets, a switching platform for switching packets between interfaces 151, 157 and among feature cards 155, which are used to perform features on packets. In one embodiment, the functionality of a network-based call interface device is performed by one or more of feature cards 155.

Figure 1C:
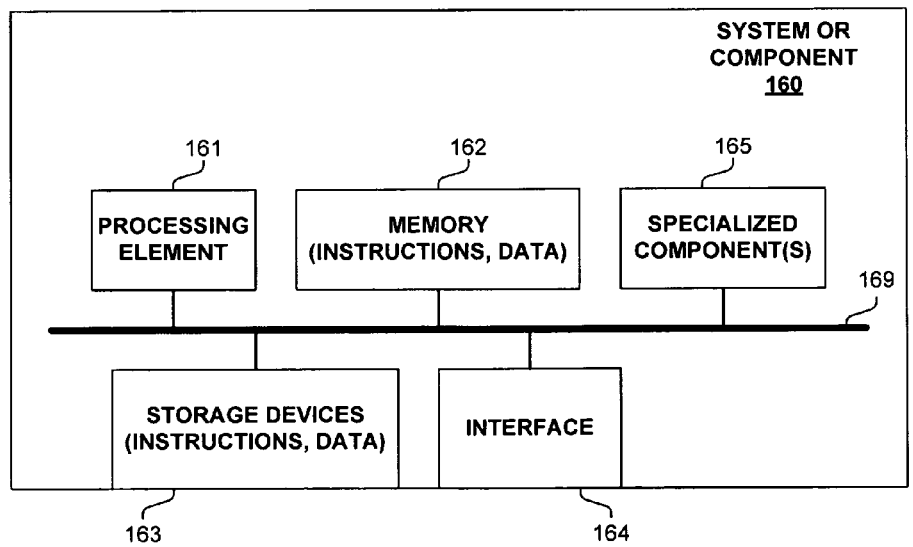

FIG. 1C is block diagram of a system or component 160 used in one embodiment of a network-based call interface device. In one embodiment, system or component 160 performs one or more processes corresponding to one of the flow diagrams illustrated or otherwise described herein.

In one embodiment, system or component 160 includes a processing element 161, memory 162, storage devices 163, an interface 164 for sending and receiving packets and/or communicating with external devices or components (e.g. classification or event detection mechanisms), and specialized components 165, which are typically communicatively coupled via one or more communications mechanisms 169, with the communications paths typically tailored to meet the needs of the application.

Various embodiments of component 160 may include more or less elements. The operation of component 160 is typically controlled by processing element 161 using memory 162 and storage devices 163 to perform one or more tasks or processes. Memory 162 is one type of computer-readable medium, and typically comprises random access memory (RAM), read only memory (ROM), flash memory, integrated circuits, and/or other memory components. Memory 162 typically stores computer-executable instructions to be executed by processing element 161 and/or data which is manipulated by processing element 161 for implementing functionality in accordance with an embodiment. Storage devices 163 are another type of computer-readable medium, and typically comprise solid state storage media, disk drives, diskettes, networked services, tape drives, and other storage devices. Storage devices 163 typically store computer-executable instructions to be executed by processing element 161 and/or data which is manipulated by processing element 161 for implementing functionality in accordance with an embodiment.

Figure 2:
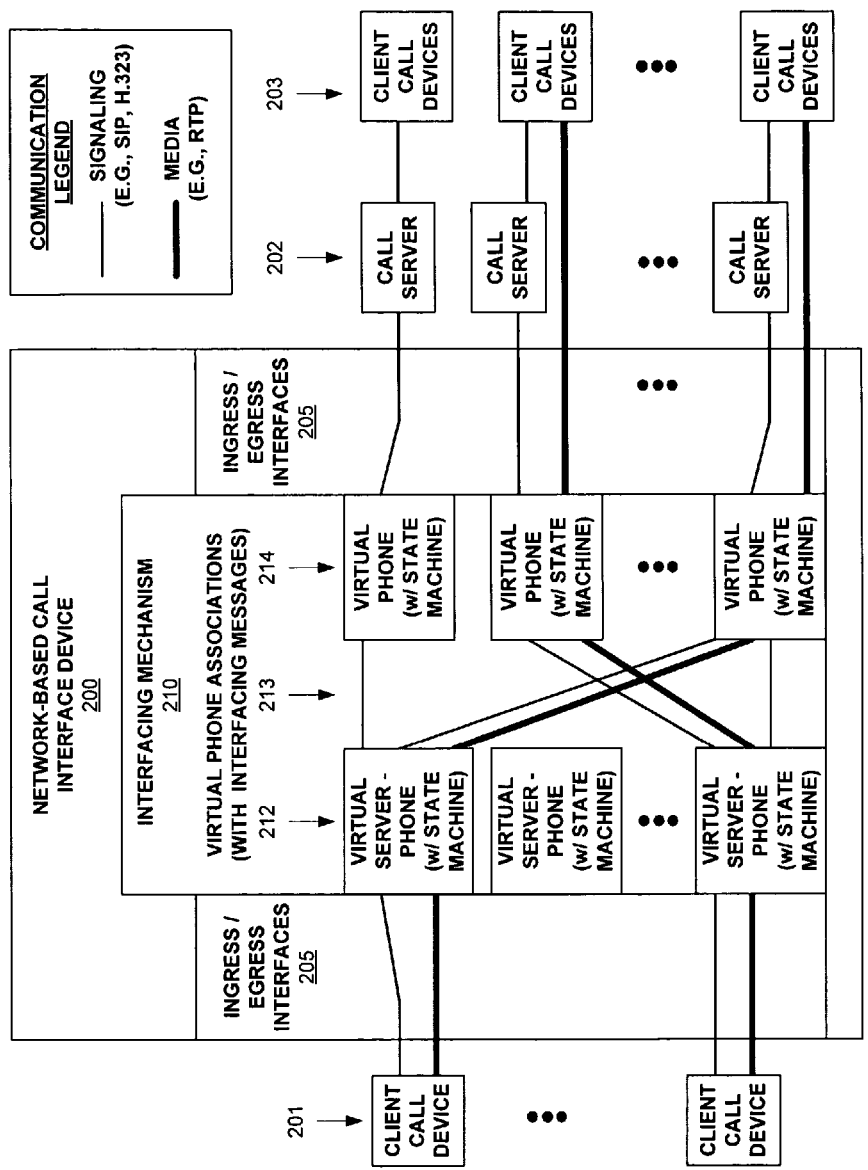

FIG. 2 illustrates one embodiment of a network-based call interface device 200, used to interface calls between client call devices 201, call servers 202, and client devices 203. As shown, network-based call interface device 200 includes ingress/egress interfaces 205 for sending and receiving packets, and interfacing mechanism 210 for performing functionality associated with interfacing calls between client call devices 201 and call servers 202/client call devices 203.

In one embodiment interfacing mechanism 210 includes virtual server-phones 212 (e.g., a process and/or mechanism that acts as a call server as well as a phone) corresponding to client call devices 201 and virtual phones 214 corresponding to call servers 202. Using virtual server-phones 212 allows network-based call interface device 200 to appear as a call server to client call devices 201. Using virtual phones 214 allows network-based call interface device 200 to appear as a client call device to call servers 202 and 212. Virtual server-phones 212 communicate/interface (213) with virtual phones 214 in order to signal and establish media calls between client call devices 201 and call servers 202/client call devices 203. In one embodiment, client devices 201 are connected to call servers 202 by associating and interfacing (213) corresponding virtual server-phones 212 with virtual call servers 214. Virtual server-phones 212 and virtual phones 214 typically operate based on call state machines which are well-known in the art. For example, descriptions of SIP and H.323 protocol state machines are standardized and available in the public domain and are implemented by numerous communications equipment providers, which provides the basis for one skilled in the art to implement state machines for use in embodiments described herein.

Also illustrated in FIG. 2 is that network-based call interface device 200 provides functionality for supporting both signaling (e.g., SIP, H.323, and/or other signaling protocols) and media (e.g., RTP and/or other media transport protocols) such that calls can be established and communicated through network-based call interface device 200, allowing end-to-end communication between client call devices 201 and client call devices 203.

Figure 3A:
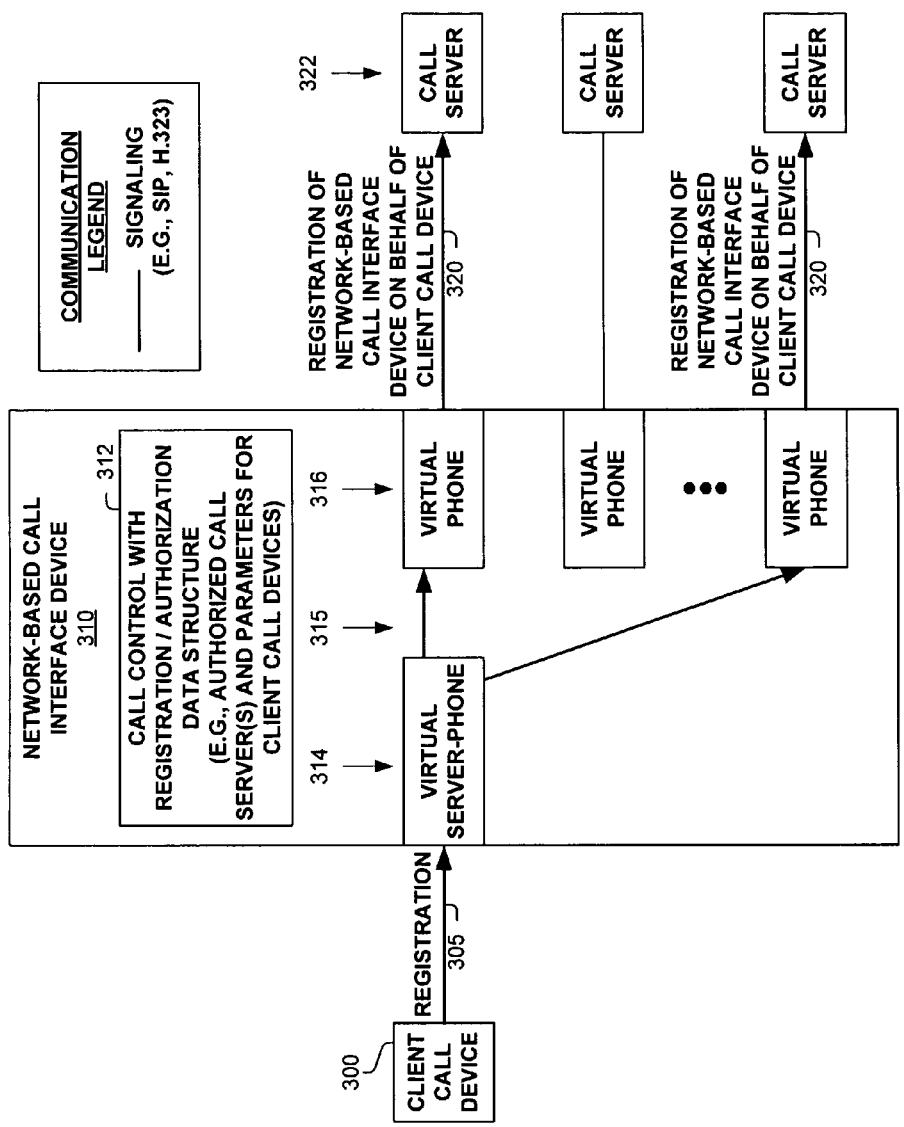
FIG. 3A is a block diagram of a network-based call interface device used in one embodiment.

FIG. 3A illustrates a network-based call interface device 310 used in one embodiment. As shown, network-based call interface device 310 includes a virtual server-phone 314 corresponding to client call device 300, call control with registration/authorization data structure 312, and virtual phones 316 corresponding to call servers 322. In one embodiment, this data structure (312) includes parameters identifying capabilities of client call devices.

In the operation of one embodiment, client call device 300 communicates a registration request (305) to network-based call interface device 310, which associates virtual server-phone 314 with client call device 300, typically based on indications of policies stored within data structure 312. In one embodiment, call control with registration/authorization data structure 312 performs a lookup operation to identify whether or not client call device 300 is authorized and possibly some associated parameters. If authorized, client call device is associated with virtual server-phone 314. Note, in one embodiment, client call device was associated with virtual server-phone 314 prior to this authorization; and in one embodiment, no authorization operation is performed. In one embodiment, virtual phones 316 are created in response to the receipt of registration request 305.

Based on the retrieved parameters and/or information contained in the registration request, network-based call interface device 310 identifies with which call servers 322 client device should be associated, and creates associations between virtual server-phone 314 and corresponding virtual phones 316. In one embodiment, corresponding virtual servers and phones 314 are created or allocated in response to such identification of which call servers 322 client device should be associated. Corresponding virtual phone(s) 316 then register (320) themselves with their corresponding call server 322 on behalf of client call device 300, such that call server 322 will communicate with network-based call interface device 310 for sending and receiving calls with client call device 300.

Figure 3B:
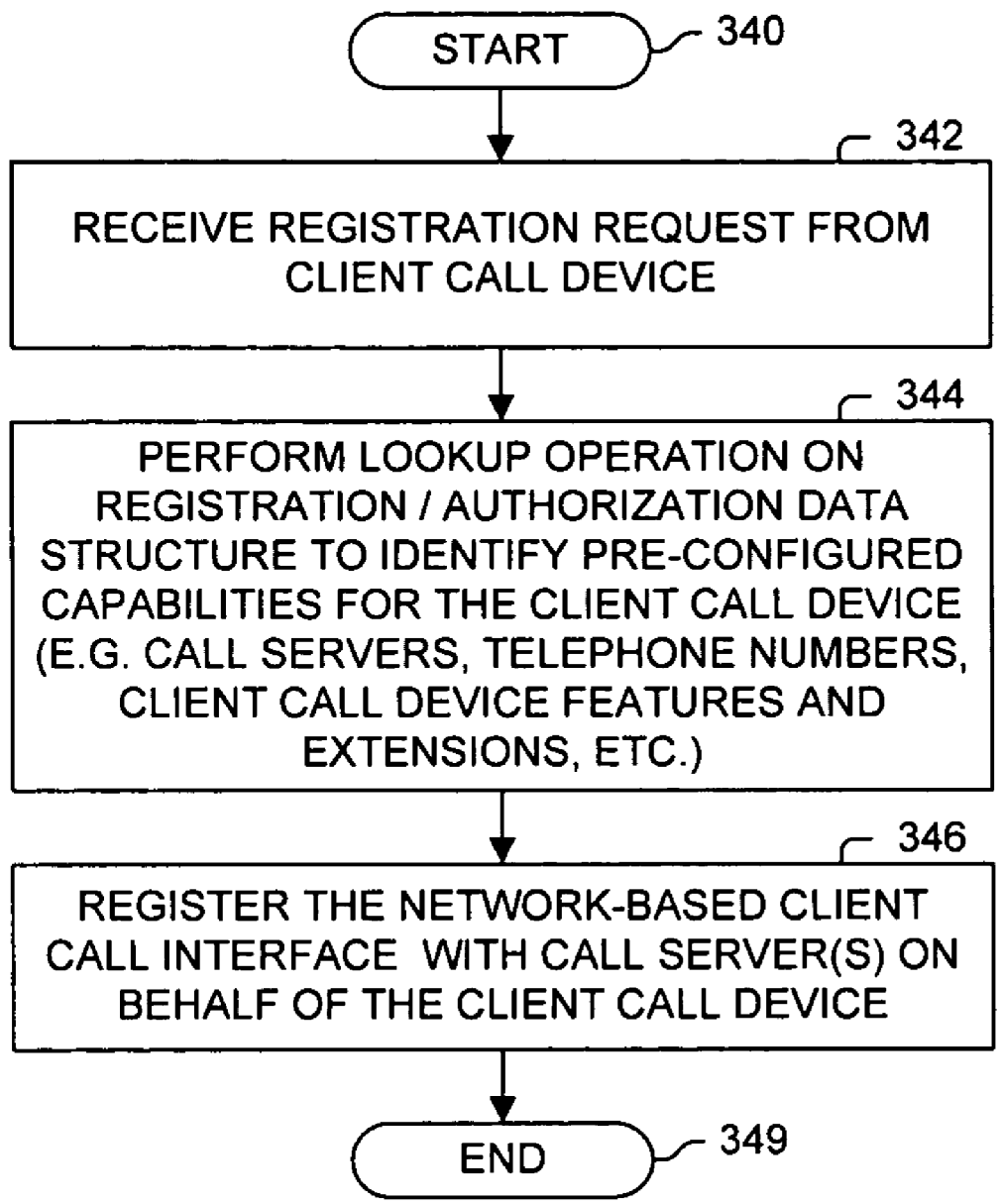
FIG. 3B is a flow diagram illustrating a process used in a network-based call interface in one embodiment.

FIG. 3B illustrates a process for registering with call servers performed by a network-based call interface device in one embodiment. Processing begins with process block 340, and proceeds to process block 342, wherein a registration request is received from a client call device. In process block 344, a lookup operation is performed on a data structure to identify pre-configured capabilities corresponding to the client call device. For example, these capabilities might be added to the data structure as part of a standard service provisioning process. In one embodiment, these capabilities include which call servers to use, telephone numbers, client call device features and extensions, etc. In process block 346, the network-based call interface device is registered with the call server(s) on behalf of the client call device. Processing is complete as indicated by process block 349.

Figure 4A:
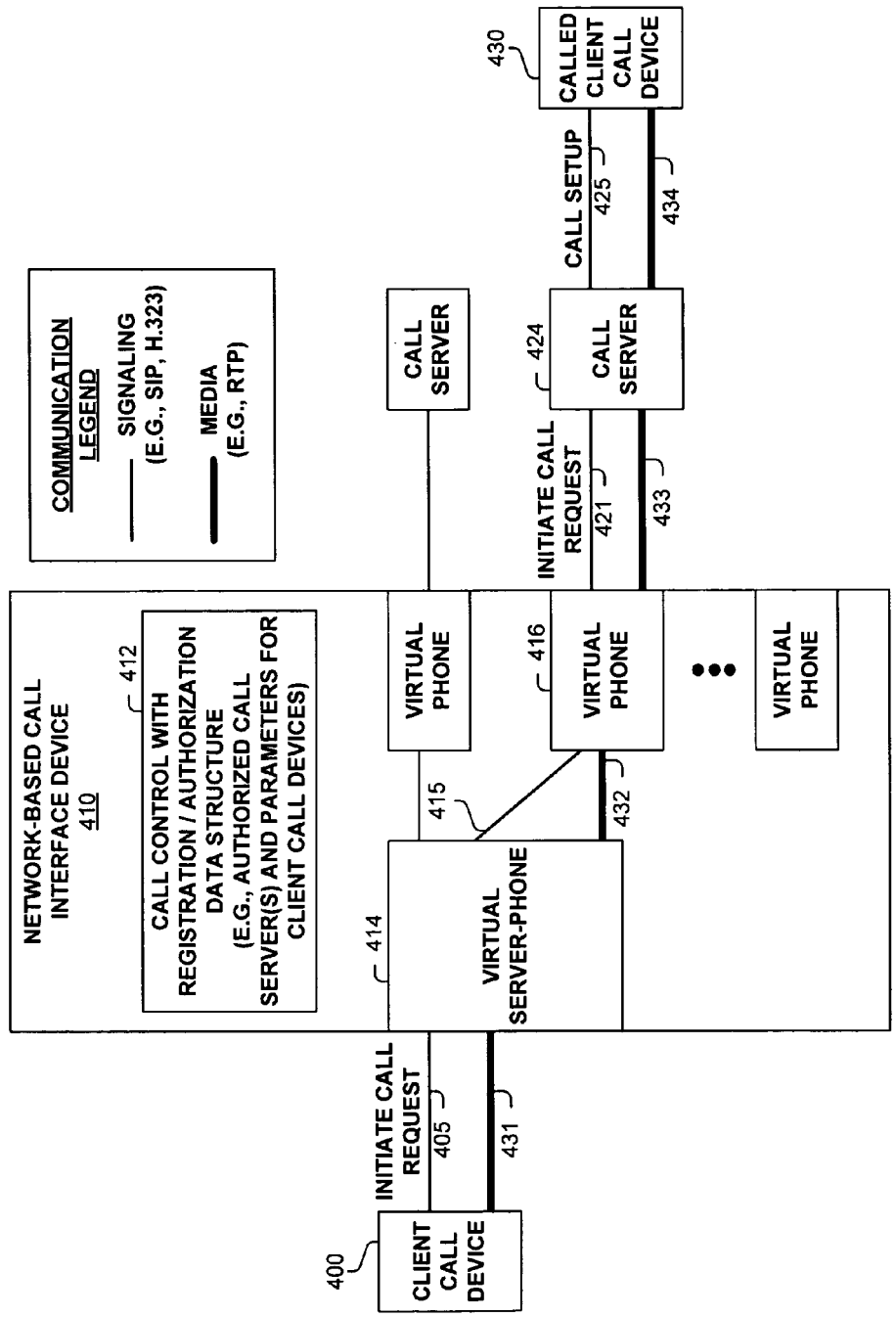
FIG. 4A is a block diagram of a network-based call interface device used in one embodiment.

FIG. 4A illustrates a network-based call interface device 410 used in one embodiment. As shown, network-based call interface device 410 includes a virtual server-phone 414 corresponding to client call device 400, call control with registration/authorization data structure 412, and virtual phone 416 corresponding to call server 424.

In the operation of one embodiment, client call device 400 communicates a call request (405) identifying call server 424 to network-based call interface device 410. In response, virtual servers and phones 414 and 416 are interfaced (415) to establish (e.g., send initiate call request 421 and perform standard call setup functions and also in response, call server 424 sends a call setup message to the client call device 430) and to maintain the media call (431-434). Depending on the embodiment, the media call may pass through call server 424 as shown in FIG. 4A or bypass a call server such as shown in FIG. 2. Note, if the call was being initiated by call server 424, this same process would have been performed but with the initiate call request coming from call server 424 and the initiate call request sent to client call device 400. Once a call is setup between network-based interface device 410 and call server 424 and between network-based interface device 410 and client call device 400/client call device 430 (typically in response to the call being established with call server 424), network-based call interface device 410 interfaces these calls such that a call is effectively established between client call device 400 and call server 424/client call device 430.

Figure 4B:
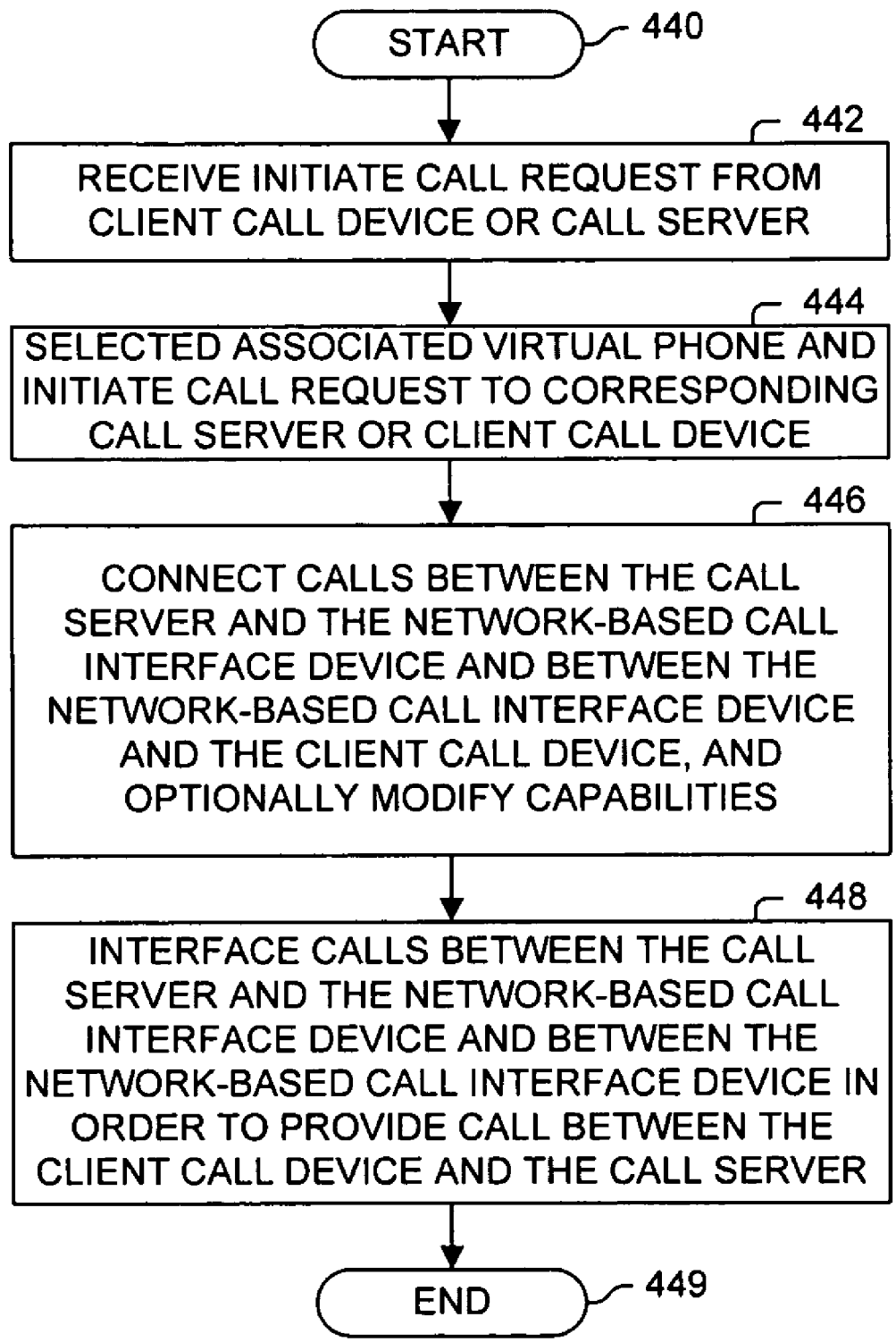
FIG. 4B is a flow diagram illustrating a process used in a network-based call interface in one embodiment.

FIG. 4B illustrates a process for setting up a call performed by a network-based call interface device in one embodiment. Processing begins with process block 440, and proceeds to process block 442, wherein an initiate call request is received from either a client call device or a call server. In process block 444, the corresponding virtual phone for the destination is identified and an initiate call request to the corresponding call server or client call device is made. In process block 446, calls are connected between the call server/its client device and the network-based call interface device and between the network-based call interface device and the client call device, with possibly capabilities or features being modified or specified for the call. In process block 448, these calls between the call server/remote client call device (e.g., the client call device associated with the call server) and the network-based call interface device and between the network-based call interface device and the client call device are interfaced by the network-based call interface device in order to provide call between the client call device and the call server/remote client call device. Processing is complete as indicated by process block 449.

A network-based call interface device typically provides advanced call features for handling multiple calls (e.g., call waiting, hold, conferencing, etc.). Additionally, when a client call device is used for multiple user call endpoints (e.g., multiple telephone numbers or other addresses), a mechanism for selecting which corresponding call server to use is provided (e.g., select the call server from a soft interface, dial a corresponding prefix, etc.) Also, a media relay with NAT traversal function may be used to enable media interworking with clients behind NAT/NAPT or firewall devices There are many variations that are used by embodiments.

Figure 5:
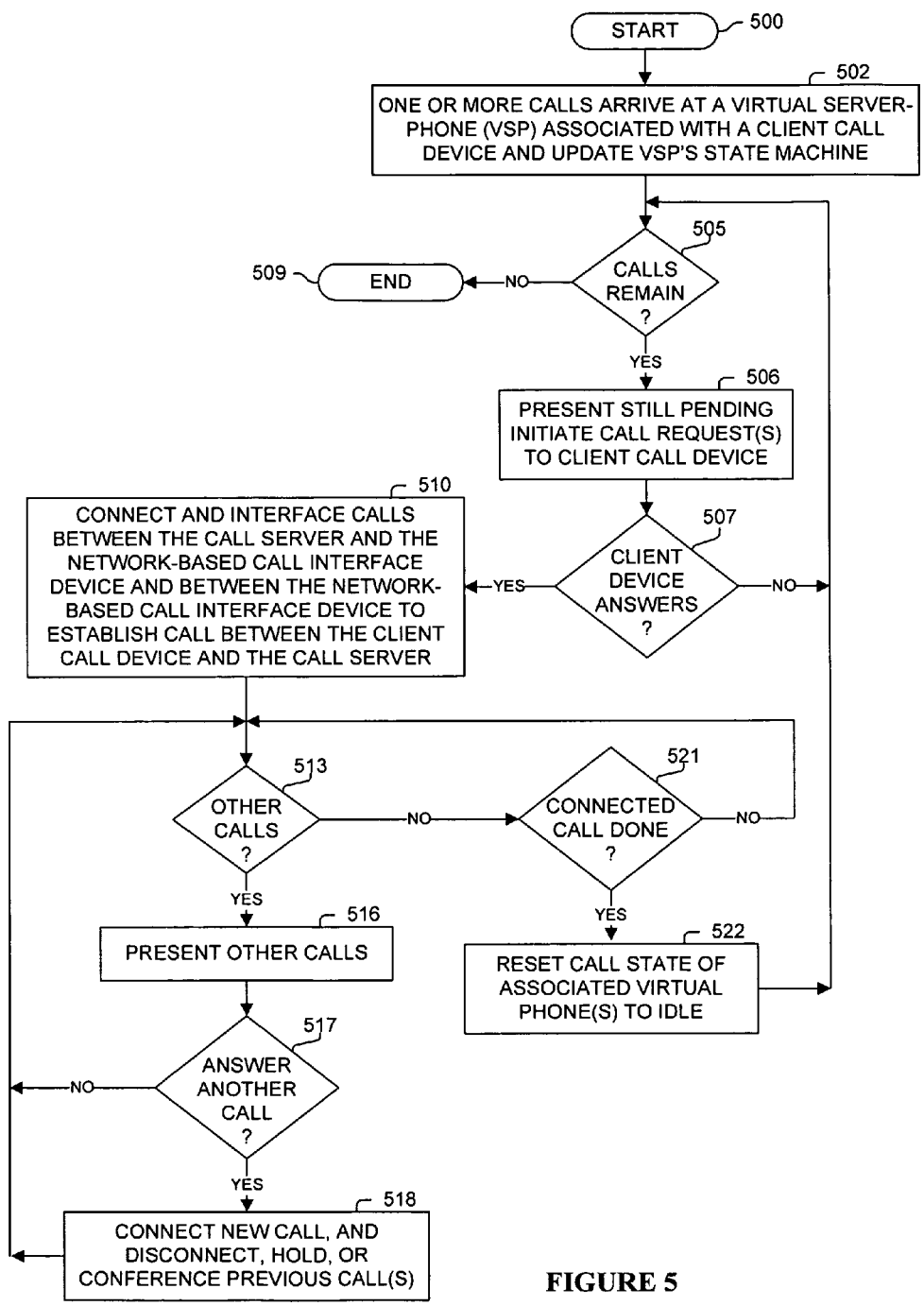
FIG. 5 is a flow diagram illustrating a process used in a network-based call interface in one embodiment.

FIG. 5 illustrates how one embodiment of a network-based call interface device handles multiple simultaneous calls going to a single client call device. Processing begins with process block 500, and proceeds to process block 502, wherein one or more calls arrive at a virtual server-phone associated with a client call device, with the state machine(s) of the virtual server-phone associated with the client call device being updated accordingly. As determined in process block 505, while there are more calls, processing continues through process blocks 506-522. In process block 506, still pending initiate call requests are presented to the client call device. Note, in one embodiment, if there is not a change from a previous communication with the client call device, this information is not re-communicated to the client call device. As determined in process block 507, if the client call device has not answered one of the initiate call requests, then processing returns to process block 505. Otherwise, in process block 510, calls between the call server/remote client call device and the network-based call interface device and between the network-based call interface device and the client call device are connected and interfaced to establish call between the client call device and the call server/remote call device. As determined in process block 513, if there are other calls pending, then these other calls are presented in process block 516. As determined in process block 517, if the client device requests the answering of another call, then in process block 518, the new call is connected, and the old call is handled in some manner, such as, but not limited to, being disconnected, placed on hold, and conferenced with the new call. Processing returns to process block 513. Otherwise, if no other calls are identified in process block 513, then as determined in process block 521, if the connected call is not done, then processing returns to process block 513. Otherwise, the call state of the associated virtual phone(s) is reset to idle. Processing returns to process block 505.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a network-based call interface device located in a network, the method comprising:
receiving, in one or more packets, a call server registration request from a client call device, the client call device being located remotely from the network-based call interface device;
in response to said received call server registration request, registering the network-based call interface device with each of a plurality of call servers on behalf of the client call device;
subsequent to said registration with each of the plurality of call servers and while network-based call interface device is registered with the plurality of call servers:
receiving, in one or more packets, an initiate call request for establishing a real-time media packet-based call between the client call device and a destination client call device registered with a particular call server of the plurality of call servers;
in response to said received initiate call request, setting up a particular call between the client device and the destination client call device, which includes establishing calls between the client device and the network-based call interface device and between the network-based call interface device and the destination client call device and interfacing said established calls, with each of said established calls being real-time media packet-based calls; wherein said establishing calls includes communicating one or more signaling messages with the particular call server; and maintaining a virtual phone for each of the plurality of call servers and a virtual server-phone for the client call device and communicating call data between the virtual server-phone and said virtual phone corresponding to the particular call server; wherein said maintaining the particular call includes maintaining a real-time media packet-based call between the client call device and the virtual server-phone and maintaining a real-time media packet-based call between said virtual phone corresponding to the particular call server and the destination client call device.

2. The method of claim 1, wherein the call server registration request is received using a first signaling protocol, and said registering the network-based call interface device with each of a plurality of call servers on behalf of the client call device is performed using a second signaling protocol for at least one of the plurality of call servers, wherein the first and second signaling protocols are different.

3. The method of claim 2, wherein either the first or second signaling protocol is Session Initiation Protocol (SIP).

4. The method of claim 3, wherein either the first or second signaling protocol is H.323.

5. The method of claim 2, wherein either the first or second signaling protocol is H.323.

6. The method of claim 1, wherein the call server registration request is received using Session Initiation Protocol (SIP).

7. The method of claim 1, wherein the call server registration request is received using H.323.

8. The method of claim 1, wherein a network protection device is configured and is located in the network in a position to block real-time media packet-based calls directly between the client device and the particular call server or directly between the client device and the destination client call device.

9. The method of claim 1, wherein a network protection device is configured and is located in the network in a position to block real-time media packet-based calls directly between the client device and the particular call server; wherein a secure tunnel is maintained to allow the network-based call interface device to communicate with the particular call server; and wherein said registration of the network-based call interface device with the particular call server includes communicating one or more packets using the secure tunnel.

10. The method of claim 1, including in response to said received call server registration request and prior to said registering the network-based call interface device with each of the plurality of call servers, performing one or more lookup operations on one or more data structures to identify the plurality of call servers for which to register.

11. The method of claim 10, wherein said one or more lookup operations identify corresponding parameters for each of the plurality of call servers, and said registering the network-based call interface device with each of the plurality of call servers includes providing corresponding parameters to call servers of the plurality of call servers.

12. A network-based call interface device located in a network, the network including: a plurality client call devices including a particular client call device, one or more call servers, and the network-based call interface device, with each of said client call devices being located remotely from the network-based call interface device, the network-based call interface device including:

one or more interfaces configured to communicate real-time packet traffic with said client call devices and said call servers; and a call interface mechanism configured to interface real-time media packet-based calls between said client call devices and said call servers in the network, wherein said interfacing real-time media packet-based calls includes interfacing a particular call of said real-time media packet-based calls between the particular client call device and a particular call server of said call servers such that the network-based call interface device appears to the particular call server as a user device, and the network-based call interface device appears to the particular client call device as a call server;

wherein the call interface mechanism includes means for maintaining a virtual phone for the particular call server and a virtual server-phone for the particular client call device and for communicating call data between the virtual server-phone and said virtual phone; wherein said maintaining the virtual phone includes maintaining a current call state; and wherein said interfacing the particular call includes maintaining a real-time media packet-based call between the particular client call device and the virtual server-phone and maintaining a real-time media packet-based call between said virtual phone and the particular call server.

13. The network-based call interface device of claim 12, wherein the network includes a network protection device configured to block real-time media packet-based call traffic not being interfaced by the network-based call interface device between the particular call server and said client call devices.

14. The network-based call interface device of claim 13, wherein the network-based call interface device is trusted by the particular call server such that at least one of said interfaces is configured to communicate real-time media packet-based calls with the particular call server without being blocked by the network protection device; and wherein said network-based call interface device is configured to determine whether or not a particular real-time media packet-based call to the particular call server initiated by the particular client call device is authorized, and in response to determining that it is authorized, allowing the particular call to be interfaced between the particular client call device and the particular call server.

15. The network-based call interface device of claim 12, wherein said real-time media packet-based calls use Real-time Transport Protocol (RTP).

16. The network-based call interface device of claim 12, wherein said real-time media packet-based calls are packetized voice calls.

17. The network-based call interface device of claim 12, wherein said real-time media packet-based calls are packetized video telephony calls.

18. The network-based call interface device of claim 12, wherein an interface of said interfaces is configured to receive, in one or more packets, a call server registration request from the particular client call device; and wherein the call interface mechanism is configured to, in response to said received call server registration request from the particular client call device, register the network-based call interface device with the particular call server for real-time media packet-based calls associated with the particular client call device.

19. The network-based call interface device of claim 18, wherein the call interface mechanism is configured to, in response to said received call server registration request from the particular client call device, also register the network-based call interface device with a second call server of said call servers different from the particular call server for real-time media packet-based calls associated with the particular client call device.

20. The network-based call interface device of claim 19, wherein the call interface device is configured to interface a second particular call of said real-time calls between the particular client device and the second call server such that the network-based call interface device appears to the second call server as a user device, and the network-based call interface device appears to the particular client device as a call server.

21. The network-based call interface device of claim 19, wherein the network-based call interface device is included in a router located on a service provider premises.

22. The network-based call interface device of claim 19, wherein said interfacing the particular call includes communicating with the particular call server using a first packet signaling protocol and communicating with the particular client call device using a second packet signaling protocol, wherein the first and second packet signaling protocols are different.

23. A network-based call interface device located in a network, the network-based call interface device comprising:
means for registering the network-based call interface device with each of a plurality of call servers in response to receiving, in one or more packets, a call server registration request from a client call device; and
means for establishing a particular call between the client device and a destination client call device using a particular call server of the plurality of call servers in response to an initiate call request received from either the client device or the particular call server subsequent to registration with each of the plurality of call servers and while the network-based call interface device is registered with the plurality of call servers; wherein said establishing the particular call between the client device and the destination client call device includes: establishing a call between the client device and the network-based call interface device, and establishing a call between the network-based call interface device and the destination client call device through one or more signaling messages with the particular call server, and interfacing said established calls; wherein each of said established calls are real-time media packet-based calls; wherein said means for establishing the particular call includes means for maintaining a virtual phone for each of the plurality of call servers and a virtual server phone for the client call device, with said maintaining the virtual phone and said maintaining the virtual server phone each includes maintaining a current call state; and wherein said interfacing the particular call includes maintaining a real time packet call between the client call device and the virtual server phone and maintaining a real time packet call between said virtual phone in the network based call interface device corresponding to the particular call server and the destination client call device; and communicating call data between said virtual server phone and said virtual phone corresponding to the particular call server.

24. The network-based call interface device of claim 23, wherein the network-based call device communicates with the particular call server via a secure tunnel.

25. The network-based call interface device of claim 23, wherein the network-based call interface device is configured to register with the plurality of call servers using multiple signaling protocols, said signaling protocols including Session Initiation Protocol (SIP) and H.323.

26. The network-based call interface device of claim 23, including in response to said received call server registration request and prior to said registering the network-based call interface device with each of the plurality of call servers, performing one or more lookup operations on one or more data structures to identifying the plurality of call servers for which to register.

27. The network-based call interface device of claim 26, wherein said one or more lookup operations identify corresponding parameters for each of the plurality of call servers, and said registering the network-based call interface device with each of the plurality of call servers includes providing corresponding parameters to call servers of the plurality of call servers.

* * * * *

UNITED STATES PATENT AND TRADEMARK OFFICE
CERTIFICATE OF CORRECTION

PATENT NO. : 7,660,299 B2  
APPLICATION NO. : 11/418865  
DATED : February 9, 2010  
INVENTOR(S) : Khouderchah et al.

It is certified that error appears in the above-identified patent and that said Letters Patent is hereby corrected as shown below:

Title Page of the Patent, Abstract Item (57), lines 3-4, replace "services/destination" with -- servers/destination --

Title Page of the Patent, Abstract Item (57), line 11, replace "as call" with -- as a call --

Column 15, Claim 1, line 13, replace "said maintaining" with -- said maintaining the virtual phone includes maintaining a current call state; and wherein said interfacing --

Signed and Sealed this

First Day of June, 2010

David J. Kappos  
*Director of the United States Patent and Trademark Office*

UNITED STATES PATENT AND TRADEMARK OFFICE
CERTIFICATE OF CORRECTION

| | | |
|---|---|---|
| PATENT NO. | : 7,660,299 B2 | Page 1 of 1 |
| APPLICATION NO. | : 11/418865 | |
| DATED | : February 9, 2010 | |
| INVENTOR(S) | : Michel Khouderchah et al. | |

It is certified that error appears in the above-identified patent and that said Letters Patent is hereby corrected as shown below:

Title page (*) Notice

Delete "by 641 days" – and insert --by 921 days--

Signed and Sealed this

Twenty-fourth Day of August, 2010

David J. Kappos
*Director of the United States Patent and Trademark Office*